US006998600B2

(12) United States Patent
Wang

(10) Patent No.: US 6,998,600 B2
(45) Date of Patent: Feb. 14, 2006

(54) MULTIFREQUENCY ULTRA-HIGH RESOLUTION MINIATURE SCANNING MICROSCOPE USING MICROCHANNEL AND SOLID-STATE SENSOR TECHNOLOGIES AND METHOD FOR SCANNING SAMPLES

(75) Inventor: Yu Wang, La Crescenta, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 218 days.

(21) Appl. No.: 10/612,442

(22) Filed: Jun. 30, 2003

(65) Prior Publication Data

US 2004/0264637 A1 Dec. 30, 2004

(51) Int. Cl.
*G02B 6/06* (2006.01)

(52) U.S. Cl. .......................... 250/227.28; 250/227.29; 250/227.2; 250/216

(58) Field of Classification Search .................. 378/43, 378/98.8, 146; 359/368; 250/310, 307, 250/234, 225, 227.28, 227.29, 227.11, 216, 250/227.2, 237 R, 201.3
See application file for complete search history.

(56) References Cited

U.S. PATENT DOCUMENTS

| | | | | |
|---|---|---|---|---|
| 4,634,857 A | | 1/1987 | Fey | 250/227.26 |
| 4,906,837 A | | 3/1990 | Doneen et al. | 250/227.29 |
| 4,922,092 A | | 5/1990 | Rushbrooke et al. | 250/214 VT |
| 5,229,841 A | | 7/1993 | Taranowski et al. | 356/406 |
| 5,515,169 A | | 5/1996 | Cargill et al. | 356/417 |
| 5,563,710 A | | 10/1996 | Webb et al. | 356/445 |
| 5,659,642 A | | 8/1997 | King et al. | 385/16 |
| 5,726,443 A | * | 3/1998 | Immega et al. | 250/227.2 |
| 5,739,915 A | | 4/1998 | Gau et al. | 356/406 |
| 5,835,649 A | * | 11/1998 | Turner et al. | 385/31 |
| 5,940,566 A | | 8/1999 | Seng | 385/116 |
| 6,018,385 A | | 1/2000 | Lampersberger et al. | 356/73 |
| 6,072,175 A | | 6/2000 | Wang | 250/227.2 |
| 6,121,603 A | | 9/2000 | Hang et al. | 250/216 |
| 6,124,936 A | | 9/2000 | Okamoto | 356/406 |
| 6,246,046 B1 | | 6/2001 | Landers et al. | 250/216 |
| 6,272,440 B1 | | 8/2001 | Shakespeare et al. | 702/85 |
| 6,320,174 B1 | | 11/2001 | Tafas et al. | 250/208.1 |
| 2003/0168580 A1 | * | 9/2003 | Romhild | 250/216 |

* cited by examiner

*Primary Examiner*—Thanh X. Luu
*Assistant Examiner*—Stephen Yam
(74) *Attorney, Agent, or Firm*—Mark Homer

(57) ABSTRACT

A miniature, ultra-high resolution, and color scanning microscope using microchannel and solid-state technology that does not require focus adjustment. One embodiment includes a source of collimated radiant energy for illuminating a sample, a plurality of narrow angle filters comprising a microchannel structure to permit the passage of only unscattered radiant energy through the microchannels with some portion of the radiant energy entering the microchannels from the sample, a solid-state sensor array attached to the microchannel structure, the microchannels being aligned with an element of the solid-state sensor array, that portion of the radiant energy entering the microchannels parallel to the microchannel walls travels to the sensor element generating an electrical signal from which an image is reconstructed by an external device, and a moving element for movement of the microchannel structure relative to the sample. Discloses a method for scanning samples whereby the sensor array elements trace parallel paths that are arbitrarily close to the parallel paths traced by other elements of the sensor array.

8 Claims, 10 Drawing Sheets

MULTIFREQUENCY ULTRA-HIGH RESOLUTION MINIATURE SCANNING MICROSCOPE USING MICROCHANNEL AND SOLID-STATE SENSOR TECHNOLOGIES AND METHOD FOR SCANNING SAMPLES

The invention described hereunder was made in the performance of work under NASA contract Nos. 20821 and 20873, and is subject to the provisions of Public Law #96-517 (35 U.S.C. 202) in which the Contractor has elected to retain title.

BACKGROUND OF THE INVENTION

1. Field of the Invention

The present invention relates to optical instruments and methods, and more particularly, to solid-state microscopy.

2. Description of Related Art

Conventional microscopes are heavy and need focus adjustment. The basic structure of a conventional optical microscope includes magnifying lenses and a moveable focusing structure. The focus of the microscope is typically adjusted each time a sample is loaded. When scientists inspect a sample under a conventional microscope, they commonly use a low magnification lens first, then change lenses for a higher and higher magnification. It is a tedious and time-consuming process to place a sample and then focus the microscope on the sample, especially when there are a lot of samples.

In addition, the multi-lens microscope is relatively heavy for some applications, and the best optical microscope can only have a resolution of about one micron due to the wavelength of visible light used to illuminate the sample. However, radiant energy in the X-ray range has a wavelength that is approximately a thousand times shorter than visible light. Thus, an ultra-high resolution, scanning microscope using X-ray illumination has the potential of obtaining a resolution that is a thousand times finer than the best optical microscope.

X-ray radiation is difficult to focus and previous technologies tried to use zone plate techniques, for example, to focus the X-rays. This method required a very precise, single wavelength X-ray source because zone plate techniques are very sensitive to wavelength variations. Further, sub-micron resolution with previous technologies required the use of relatively large, heavy and expensive equipment that necessitated sophisticated sample preparation techniques and control during examination.

SUMMARY OF THE INVENTION

The present invention is directed to several embodiments of an ultra-high resolution, color, and polarized scanning microscope that do not require focus adjustment. This provides enhanced image detection through the use incident illumination of multiple frequencies as well as polarization filters.

Further, this invention provides sub-micron resolution while at the same time being less expensive and lighter than previous technologies without requiring sophisticated sample preparation techniques. While using the device, all the information for constructing an image will be available in one scanning pass and the choice between a higher or lower magnification will be determined by a computer reconstruction of the microscope output signals.

BRIEF DESCRIPTION OF THE DRAWINGS

The exact nature of this invention will be readily apparent from consideration of the following detailed description in conjunction with the accompanying drawings, wherein.

DETAILED DESCRIPTION OF THE PREFERRED EMBODIMENTS

Details of the present invention are explained in reference to the attached drawings that are meant not to limit the disclosure, but rather to illustrate various features. The following description is provided to enable any person skilled in the art to make and use the invention and sets forth the best modes contemplated by the inventor of carrying out his invention.

Figure 1:
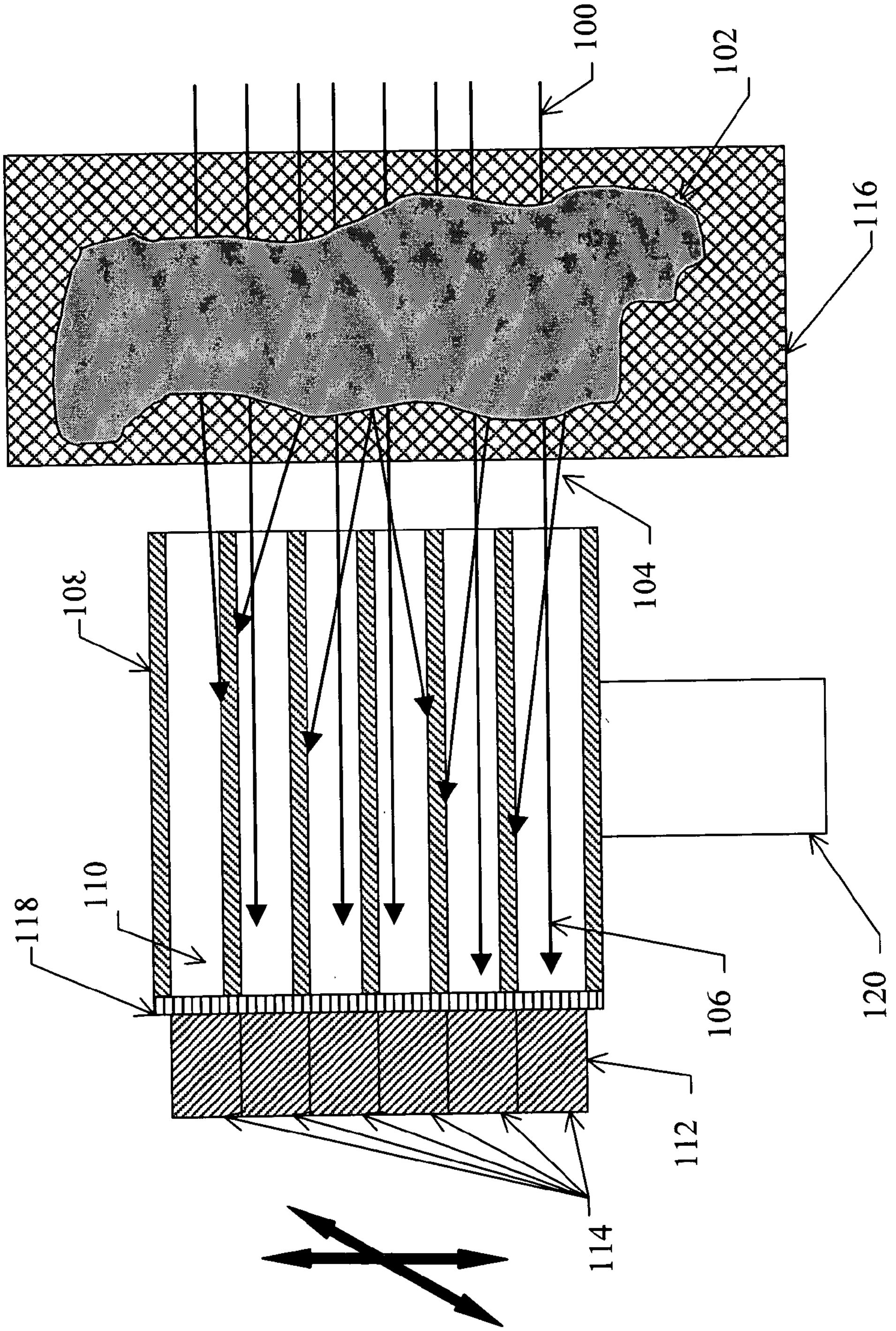
FIG. 1 shows a cross-sectional view of a transmissive embodiment and the sample optionally surrounded by an index matching fluid to reduce surface scattering.

FIG. 1 shows a transmissive embodiment of the present invention. When highly collimated radiant energy 100, denoted hereinafter simply as light, is incident on a sample 102, some portion of the light scatters. The scattered light 104 may spread in all directions while the unscattered light 106 will follow the original direction of the incident light.

The first end of a microchannel optical filter 108, also called a narrow angle filter, a microchannel filter, or simply microchannels, is placed near the sample 102 to allow some portion of the transmitted light to enter the microchannels from the sample. The microchannel filter 108 is composed of individual microchannels 110 arranged in a fixed pattern. The term microchannel may refer to either an individual channel or a collection of channels in a microchannel array structure.

Only unscattered light 106 traveling along a path parallel to the long axis of the microchannels will pass through the microchannels to reach a corresponding element of the solid-state sensor array 112, composed of individual solid-state sensor elements 114, which is placed adjacent to and aligned with the second end of the microchannel, while scattered light 104 traveling in other directions within the microchannel is absorbed. Thus, the microchannels define a one-to-one mapping from a point on the sample to an individual element of the solid-state sensor array.

An optional intermediate planar layer 118 contains a luminescent material for converting light of higher frequencies into the detectable range for the solid-state sensor elements 114. For example, the luminescent material may be phosphorus for converting radiant energy in the X-ray range into visible light for detection by the solid state sensor elements.

The light from the sample which reaches the solid-state sensor array elements generates an electrical signal from which an image is reconstructed by an external device such as a suitably programmed computer with an image display. FIG. 1 also shows the sample optionally surrounded by an index matching fluid 116. The index matching fluid has approximately the same refractive index as the sample so as to reduce the surface scattering of light from the sample. The moving element 120 moves the microchannel structure 108 with the attached sensor array elements 112 allowing a scanning of the sample 102.

Figure 2:
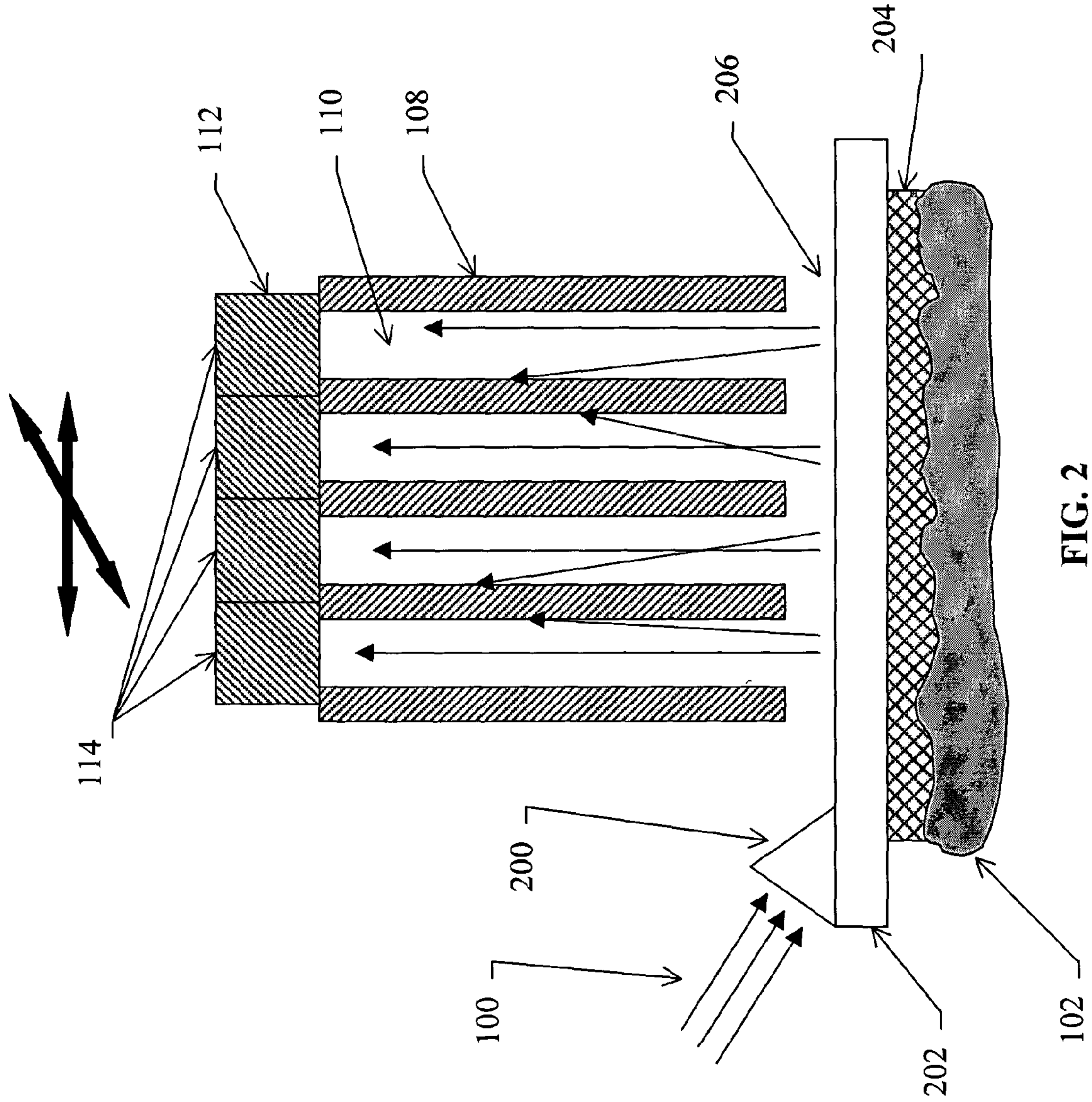
FIG. 2 shows a cross-sectional view of a reflective embodiment with a prism and a wave-guide to deliver light to the sample also showing the air gap between the waveguide and microchannels.

FIG. 2 shows a reflective embodiment of the present invention, including a wave guide to deliver the light to the sample. Light 100 is directed into a coupling prism 200 that couples light to a wave-guide 202 to deliver the light to the sample 102. The wave-guide is a planar member of an optically conductive material such as a glass plate. The space between the glass plate 202 and the sample is filled with an index matching fluid 204, which has approximately the same refractive index as the glass plate. Having the same refractive index minimizes any impedance mismatch between the bottom surface of the glass plate and the index matching fluid to permit light to escape from the bottom surface of the glass plate and illuminate the sample and will be reflected by the sample.

There is total internal reflection of the light in the waveguide at the top surface of the glass plate 202 due to a thin air gap 206 while on the bottom surface of the glass some portion of the light will escape to pass through the index matching fluid 204 to illuminate the sample. Some portion of the light reflected from the sample will pass through the index matching fluid and glass plate to enter one of the microchannels 108 and reach a corresponding element 114 of the solid-state sensor array 112 to generate an electrical signal from which an image is reconstructed by an external device.

Although four microchannels 108 are shown in FIG. 2, the actual number and arrangement may be different than that shown if the light passing and light absorbing characteristics are maintained. The microchannel structure is fixed to the wave-guide 202 (not shown) as a part of the rigid structure of the embodiment. The rigid structure is attached to a movable element to effect movement of the microscope of this embodiment over a sample.

FIG. **3*a* shows a cross-sectional view of a reflective embodiment using solid-state emitters 300 such as Light Emitting Polymers (LEP) or Light Emitting Diodes (LED) to illuminate the sample 102. On the end of the microchannels 108 near the sample, light generated by the solid-state emitters 300 shines upon the sample. Some portion of this light is reflected by the sample surface and enters one end of the microchannels 108 through a transparent covering 302. This transparent covering protects the solid-state emitter structure while also supporting conduction wires to power the solid-state emitter elements. Only the reflected light that is parallel to the channel walls can reach the solid-state detector array elements 112 at the opposite end of the microchannel optical filter 108** to produce signals from which an image is reconstructed by an external device.

Figure 3B:
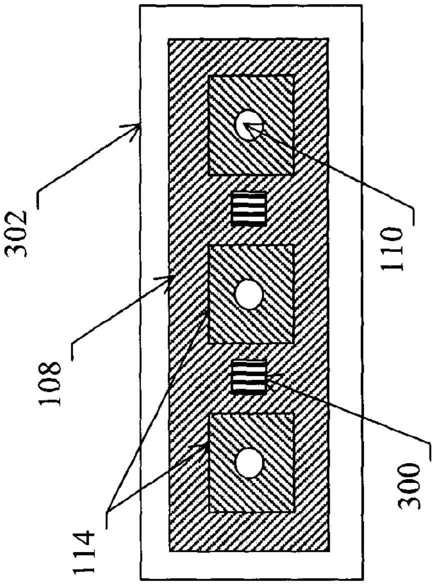
FIG. 3*b* shows an end-view of a 1-dimensional array of this embodiment including the solid-state emitters mounted on the end of the microchannels and between adjacent microchannels on the same row.
Figure 3C:
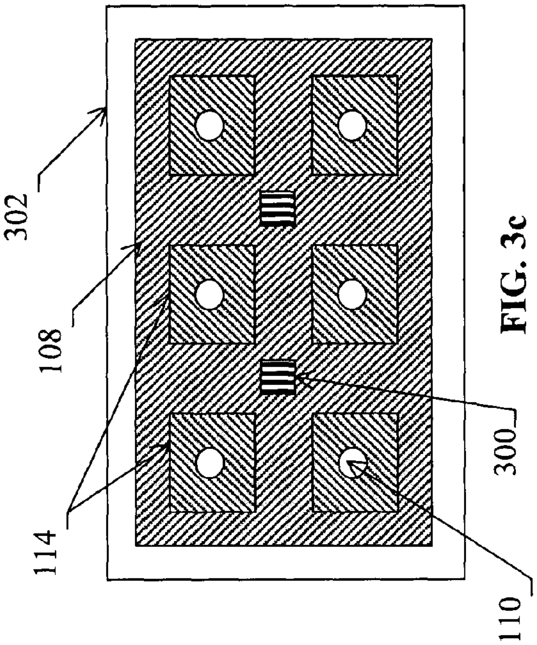
FIG. 3*c* shows an end-view of a 2-dimensional array of this embodiment including the solid-state emitters mounted on the end of the microchannels and at a point equidistant from the four neighboring microchannels.
Figure 3A:
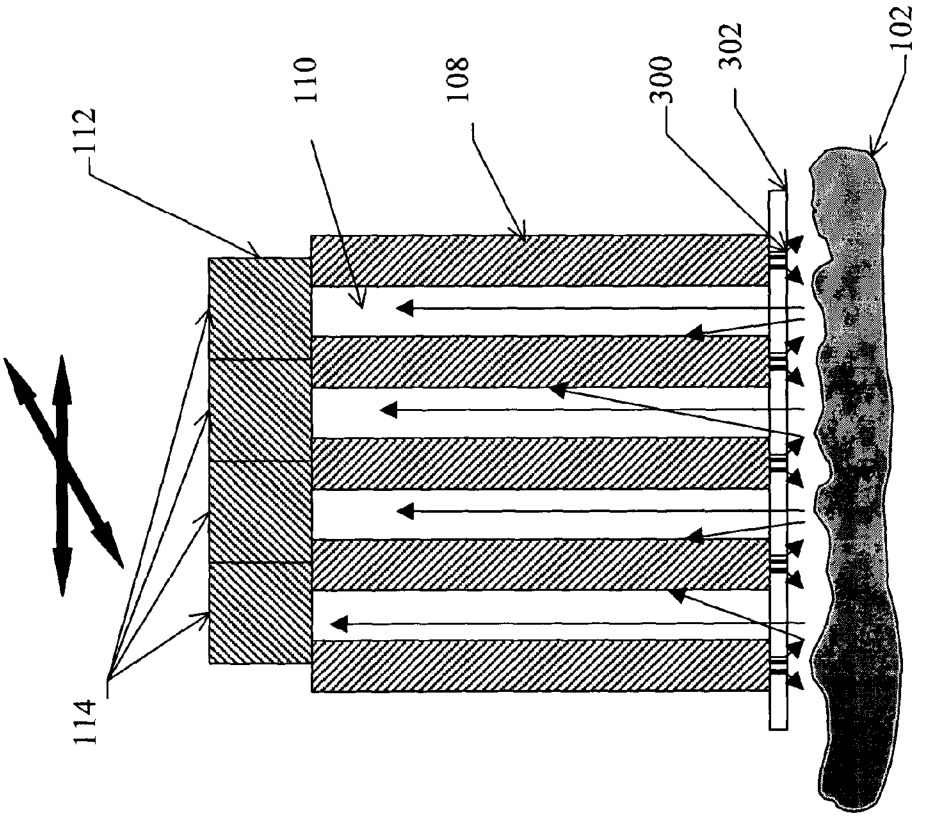
FIG. 3*a* shows a cross-sectional view of a reflective embodiment with the solid-state emitters mounted on the end of the microchannel optical filter near the sample.

FIG. **3*b* is a cross-sectional view showing the placement of a solid-state emitter 300 relative to the location of the neighboring microchannels 108 in a 1-dimensional array. FIG. 3*c* is a cross-sectional view showing the placement of a solid-state emitter 300 relative to the location of several neighboring microchannels 108 in a 2-dimensional array. The size of a solid-state emitter is smaller than the size of the surrounding mounting surface of the microchannel optical filter 108 so as to prevent unreflected light from entering the microchannels at an angle such that this light may reach the solid-state sensor array elements 114**. Similarly, for a 1-dimensional array, the solid-state emitters would be located between the microchannels.

FIG. **4*a* shows a reflective embodiment built in a scanning mode with a beam splitting element. Light 100 is incident upon the first side of a beam splitting element 400 that allows a portion of the incident light to be directed out a second side of the beam splitting element. Some portion of the light from the second side of the beam splitting element is reflected upon the sample 102 and become reflected by the sample surface. A portion of the light reflected by the sample surface will then pass through the beam splitting element 400, entering the second side of the beam splitting element and leaving the third side of the beam splitting element on the side opposite the second side. Some portion of the light leaving the third side of the beam splitting element enters the microchannels 108 while only the light parallel to the microchannel walls will reach a corresponding element 114 of the detector array 112** to produce signals from which an image is reconstructed by an external device. When this reflective embodiment is moved relative to the surface of a sample, or the sample is moved relative to this reflective embodiment, a scanning image is obtained. By tracing a path over the surface of a sample, an image of that surface may be reconstructed.

Figure 4A:
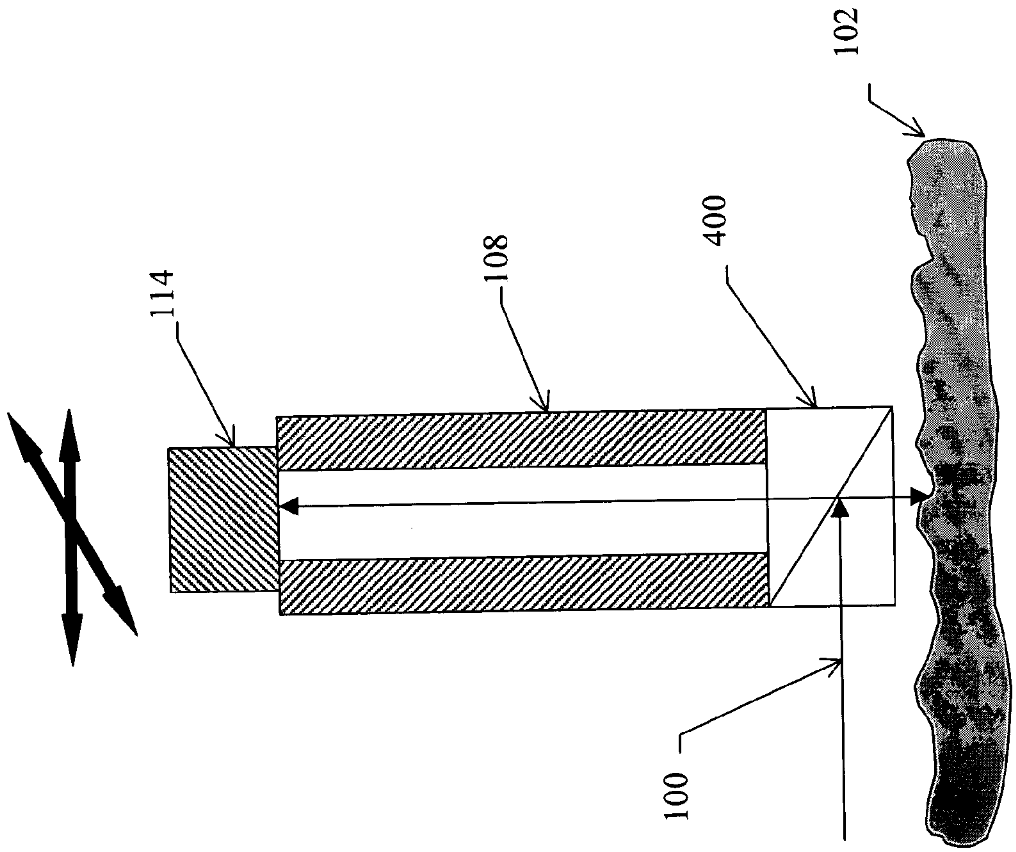
FIG. 4*a* shows a reflective embodiment built in a scanning mode with a beam splitting element.

FIG. **4*b* shows a polarizing beam splitting element 402 for use in the reflective embodiment. Similar to FIG. 4*a*, in one embodiment of a parallel phase polarized beam splitting element, unpolarized light 100 shines on a polarizing beam-splitter 402, the p-component or parallel phase of the incident light passes through while the s-component or perpendicular phase reflects on the sample 102**.

Alternatively, for a perpendicular phase polarized beam splitting element, unpolarized light 100 shines on a polarizing beam-splitter 402, the s-component or perpendicular phase of the incident light passes through while the p-component or parallel phase reflects on the sample 102. The reflected light is then scattered by the sample surface, back toward the polarizing beam splitter. If the polarization of the light has been changed by reflection of the sample surface, the light will be able to pass back through the polarizing beam splitter, and enter the microchannels 108 to reach the solid-state detector elements 112 and generate an electrical signal from which an image is reconstructed by an external device.

Figure 5:
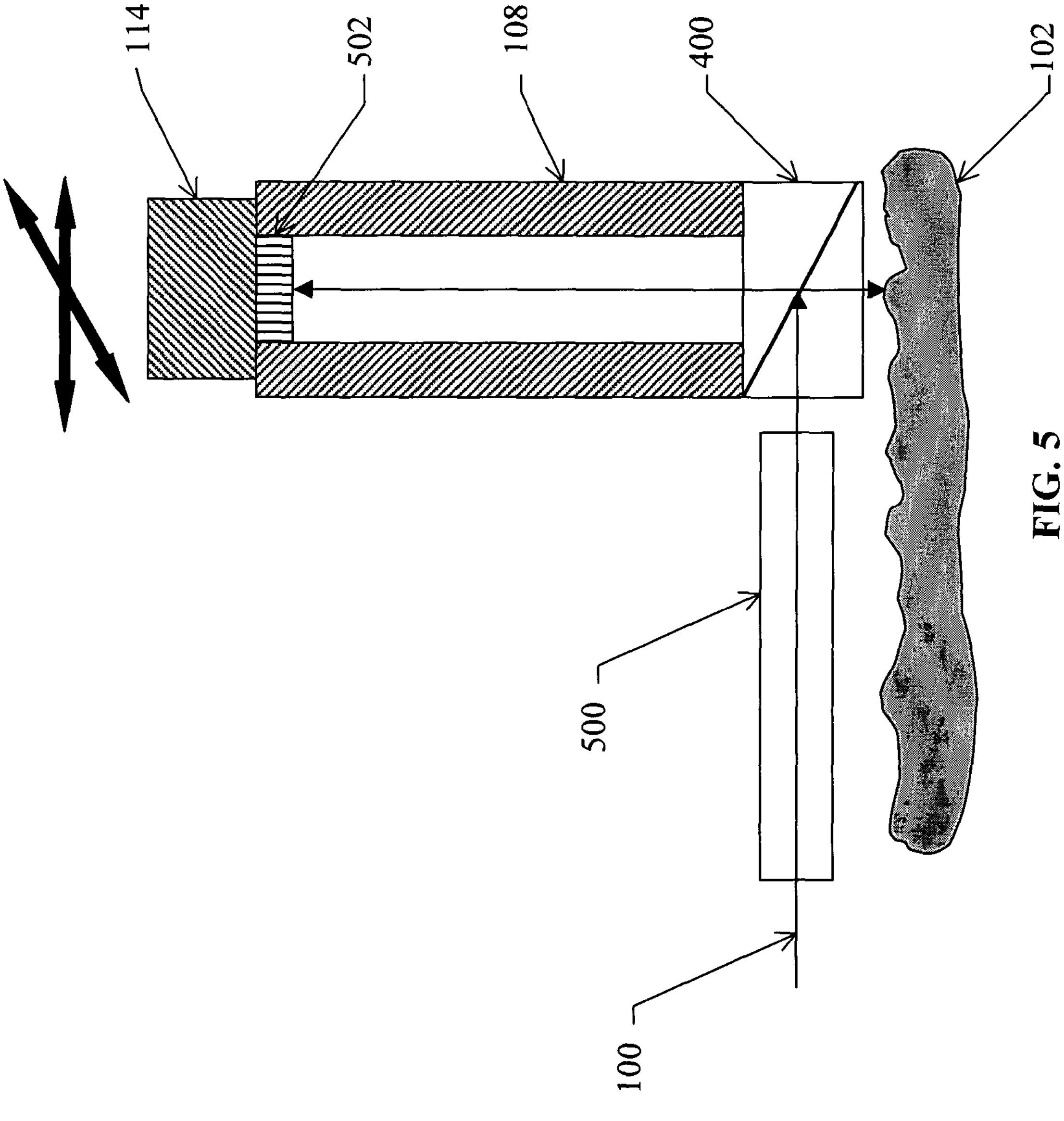
FIG. 5 shows a reflective embodiment with a wave-guide for conducting radiant energy in the X-ray range to the beam splitting element.

FIG. 5 shows a reflective embodiment using incident radiant energy in the X-ray range. In this embodiment, incident radiant energy 100 in the X-ray range, denoted simply as light, is directed by a wave-guide 500 to a beam splitting element 400 that allows a portion of the incident light to be reflected upon the sample 102 and become reflected by the sample surface. A portion of the light reflected by the sample surface will then pass through the beam splitting element 400 and enter the microchannels 108 while only the light parallel to the microchannel walls will reach a phosphorus plug 502, each phosphorus plug corresponding to an element 114 of the detector array 112.

Only light traveling parallel to the channel walls will reach the phosphorus plug 502 where the X-ray energy will be converted by the phosphorus into visible light. This visible light will produce a signal in the corresponding element 114 of the detector array 112 to produce signals from which an image is reconstructed by an external device. When this reflective embodiment is moved relative to the sample surface, or the sample surface is moved relative to this reflective embodiment, a scanning image is obtained. By tracing a path over the surface of a sample, an image of that surface may be reconstructed.

Figure 6B:
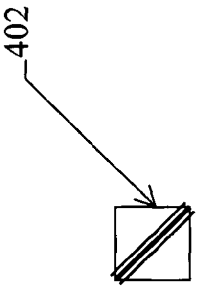
FIG. 6*b* shows a polarizing beam splitting element for use in the reflective embodiment.
Figure 6A:
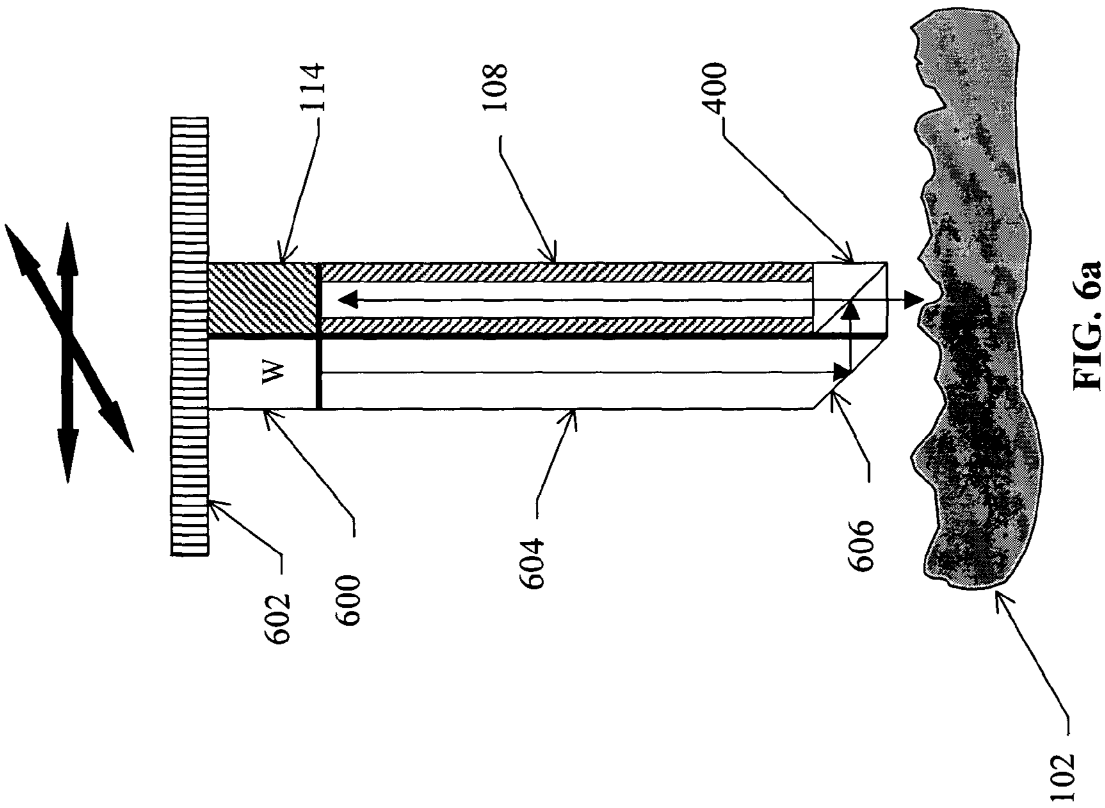
FIG. 6*a* shows a reflective embodiment built in a scanning mode with a beam splitting element and with both the emitter and detector element mounted on a single scanning stage.

FIG. 6*a* shows a reflective embodiment built in a scanning mode with the solid-state emitter element 600 and solid-state detector element 114 mounted on a single scanning stage 602. The solid-state emitter is an illumination source of radiant energy, denoted simply as light, such as a light emitting diode (LED) or a light emitting polymer (LEP). This illumination source 600 emits light in a narrow range around wavelength W. The scanning stage 602 is a rigid member providing structural support for the mounting and moving of this embodiment. The illumination element 600 emits light into a wave-guide 604. The light in the wave-guide reflects off an internal reflective surface 606 on the inside of the waveguide 604.

Figure 4B:
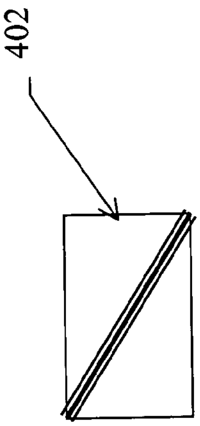
FIG. 4*b* shows a polarizing beam splitting element for use in the reflective embodiment.

The internally reflected light is directed towards a beam-splitting element 400 that allows a portion of the internally reflected light to be reflected upon the sample 102 and become reflected by the sample surface. A portion of the sample reflected light then passes through the beam splitting element to enter the microchannel 108 while only the light parallel to the microchannel walls will reach the detection element 114 to produce a signal from which an image is reconstructed by an external device. FIG. 6*b* shows a polarizing beam splitting element 402 for use in the reflective embodiment. Similar to the discussion regarding FIG. 4*b*, polarized light is detected.

Figure 7:
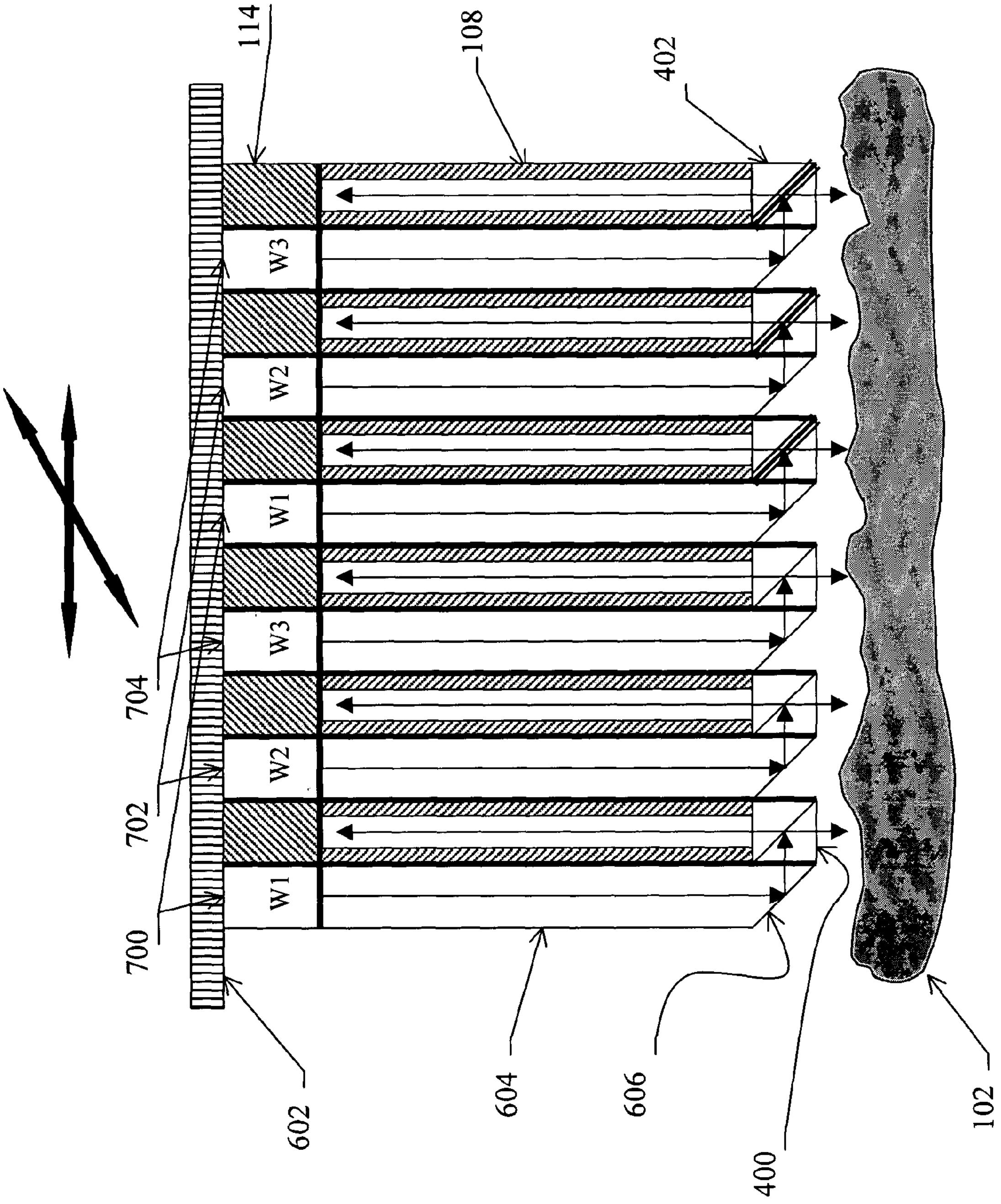
FIG. 7 shows a reflective embodiment comprising a 1-dimensional polarizing color microscopes mounted on a single scanning stage.

FIG. 7 shows a reflective embodiment combining several scanning microscopes with both polarized beam splitter elements 402 and non-polarized beam splitter elements 400 together on a single scanning stage 602. These scanning microscopes use a plurality of different solid-state emitters using different wavelength illumination so that a miniature multi-color microscope is obtained. The operation of the individual microscopes is discussed in reference to FIGS. 6*a* and 6*b*.

In this present embodiment, there are three different wavelengths of illumination shown W1 700, W2 702, and W3 704 for the solid-state emitter elements which will allow a three-color image to be scanned at the same time from the same sample. Correspondingly, there are three other microscopes with polarized beam splitter elements 402 which will allow a three-color polarized image to be scanned at the same time from the same sample. Thus, this instrument will provide both a three-color image and a three-color polarizing image in one scan over a sample.

Although three colors have been shown, an instrument with as few colors as two or as many colors as is practical may be constructed. The wavelength of the associate emitter should preferably be a substantially different wavelength that is not within the normal variation of wavelength of emitters of the same frequency. Further, although it may be convenient to have a polarizing microscope cell for each non-polarized cell, it is not required to be so. Any number of colors and polarizations may be combined. These microscope cells may be arranged in a regular or irregular configuration in 1-dimension or 2-dimensions. These rows and columns may be arranged in a regular, rectangular fashion, to adapt to a particular sensing array. This instrument may be used to examine relatively rough surfaces because there is no focus adjustment required. If the scanning stage is attached to a robot arm, the robot arm may perform a scanning movement and the weight of this instrument may be reduced further. Scanning may be performed in 2-dimensions.

Figure 10:
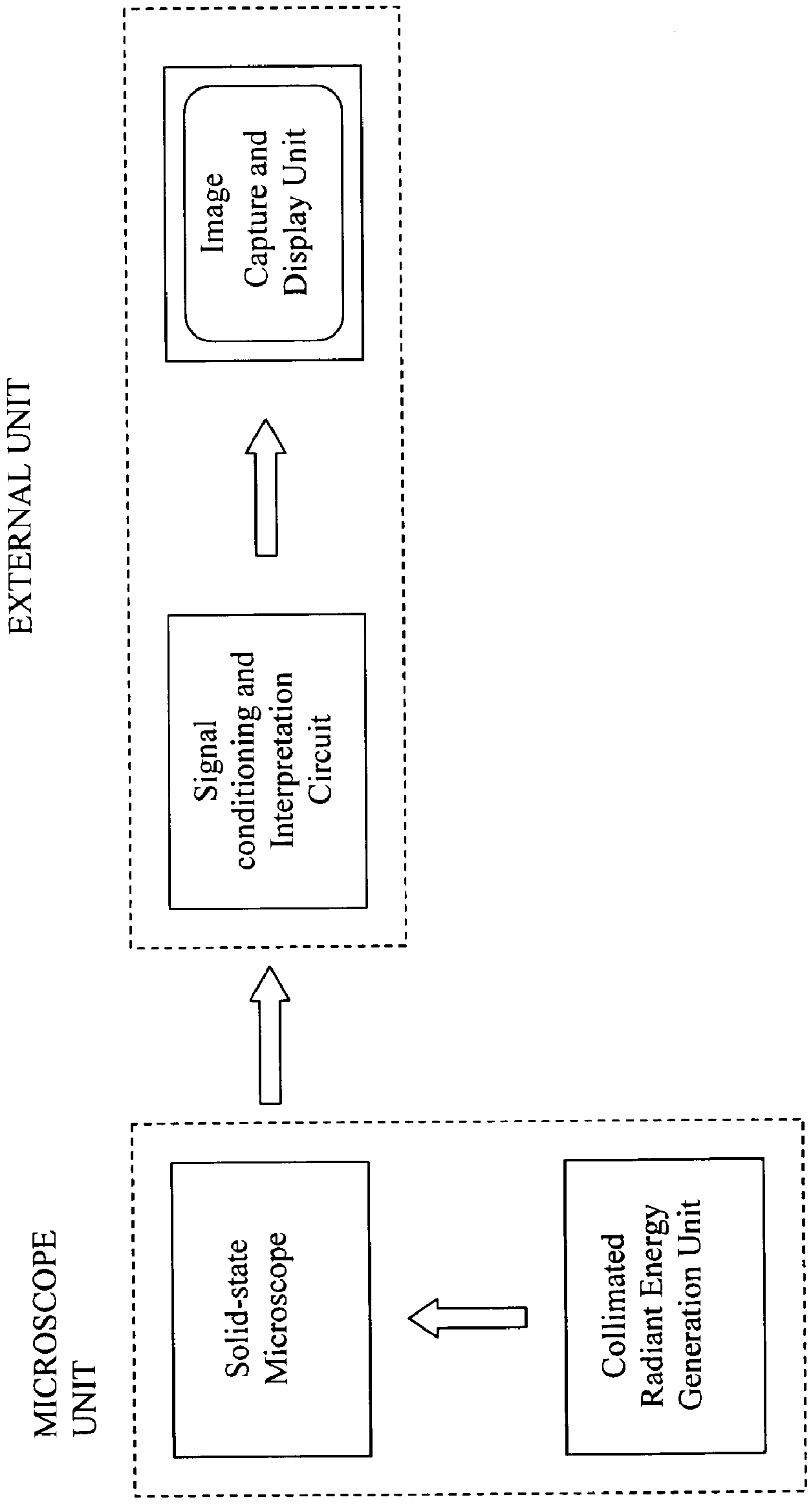
FIG. 10 shows the system including the solid-state microscope, collimated radiant energy generation unit, signal conditioning and interpretation unit, and image capture and display unit.

For all of the above embodiments, the solid-state detection elements 114 may be a charge-coupled device (CCD) or an active pixel sensor or other device that transforms photonic energy into an electrical signal from which some information about the photonic energy may be determined. These signals are reconstructed into an image by an external device as shown in FIG. 10. The source of light may be attached to or separated from the embodiment as shown in FIGS. 2 through 7.

Ultra-high resolution is obtained in two ways. First, by using light with a shorter wavelength, specifically in the X-ray frequency range from about $3\times10^{16}$ Hz to about $3\times10^{19}$ Hz, which will allow much finer resolution than visible light used for illumination with optical microscopes. For faster imaging, a phosphorous coating layer may be required to produce a reaction to the X-ray photons that have traveled the length of the microchannel and arrived at the sensor. Thus the phosphorous coating allows the conversion of energy in the X-ray range to energy in the visible range.

The microscope may scan in both the x and y directions with a step size equal to the diameter of the microchannel. The diameter of the microchannels may be much smaller than the pitch of the image sensors themselves. For example, for a 1.5-micron pitch sensor element array and 0.5-micron diameter microchannels, the scan step will be 0.5-micron at both x and y directions. The resolution of this microscope will equal to the diameter of the microchannel.

In another example, if we want a 0.1-micron resolution, then the diameter of the microchannels will be 0.1-micron, and the scan step size will also be 0.1-micron. The microchannel structure is show in FIGS. 8*c* and 8*d*, the position of microchannels of each row shifts down an offset distance equal to the microchannel diameter. The number of columns will equal to the pitch of the sensors divided by the microchannel diameter. For example, if the sensor pitch is three times the microchannel diameter, then to achieve the desired resolution, we'll need to have three columns.

Figure 9:
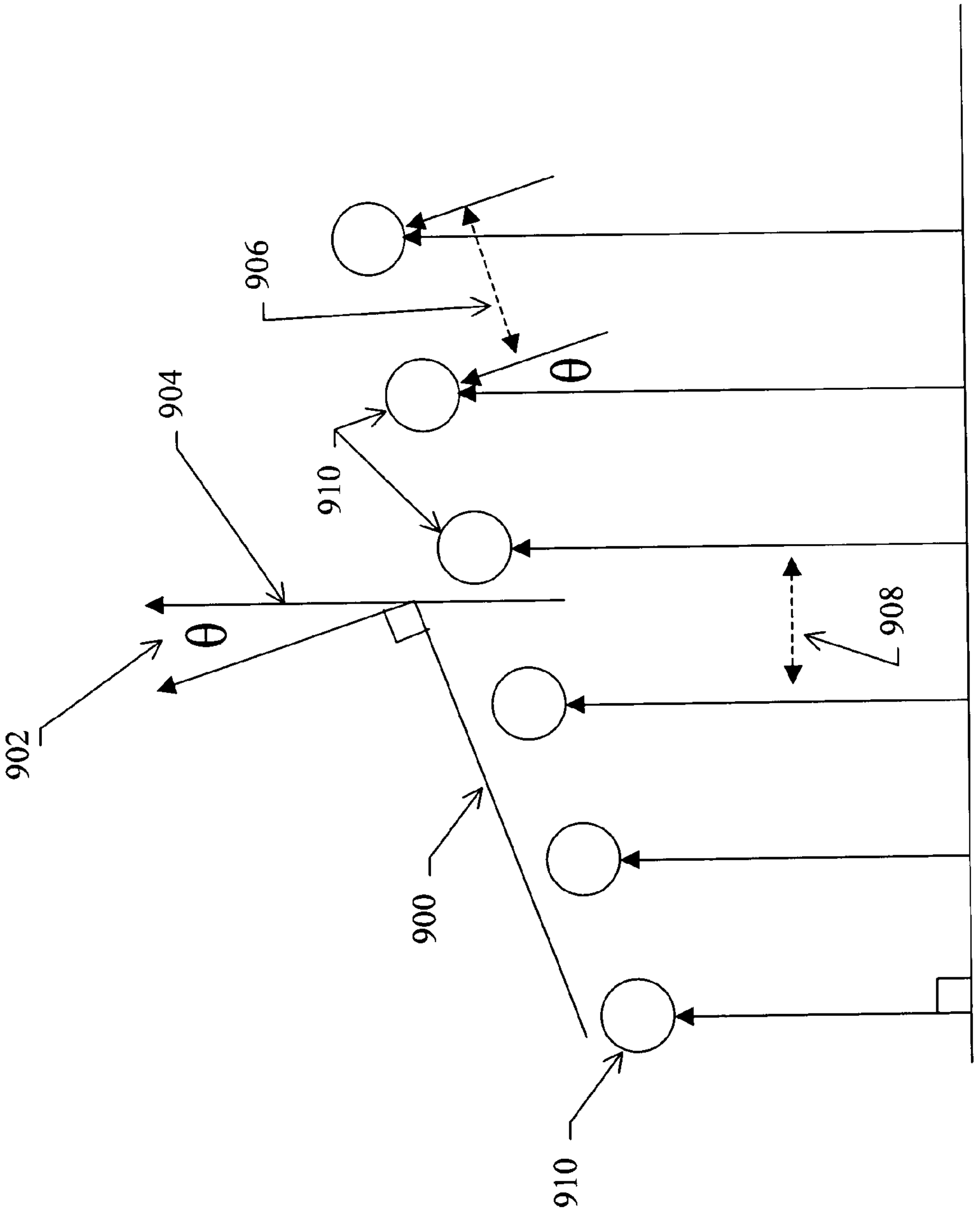
FIG. 9 shows the method for scanning samples comprising a "crabbing scan technique" to enable higher resolution.

In the view of FIG. 9, a second method by which an ultra-high resolution image may be obtained is by using of a scanning method denoted a "crabbing scan technique." In this technique, a sensing array structure composed of sensing elements 910 with an alignment 900 is rotated or yawed slightly and angle of yaw 902 from a heading aligned with path of scanning 904 so that array elements 910 will scan parallel tracks which are arbitrarily close to, and possibly partially or completely overlapping paths scanned by other elements in the sensing array. The proximity of the parallel scan paths traced by the sensing elements 910 may be arbitrarily close to each other by controlling the variable angle of rotation for the sensing array structure relative to the line of scanning.

This crabbing technique is intended to allow a regular implementation of microchannel and sensor pairs with a normal microchannel distance 906 to enable adjacent cells to trace a path that is arbitrarily close to a path traced by some other element in the sensor array with a reduced microchannel distance 908. If D906 is the linear distance between microchannels, and D908 is the distance between the parallel tracks traced by adjacent microchannels using the crabbing scan technique, the distance between these parallel tracks is given by D906=D908*cos(θ) where θ (theta) is the angle of yaw 902. This facility comprehends a full or partial redundancy that can compensate for failed elements in the sensing array structure as well as to allow an external device to reconstruct a much finer quality image through the collection of multiple, overlapping images of an area of the sample.

Figure 8A:
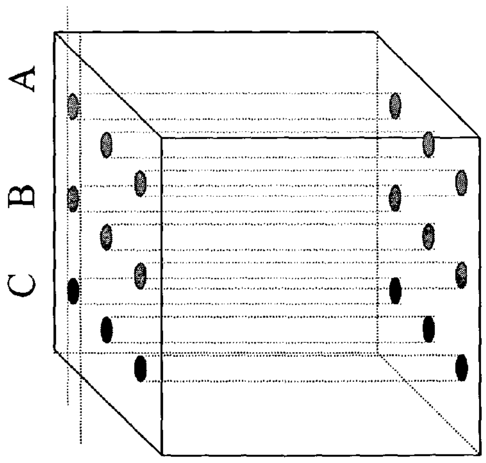
FIGS. 8*a*–8*d* show an implementation of the microchannels arranged in both a regular and an off-set row configuration.
Figure 8B:
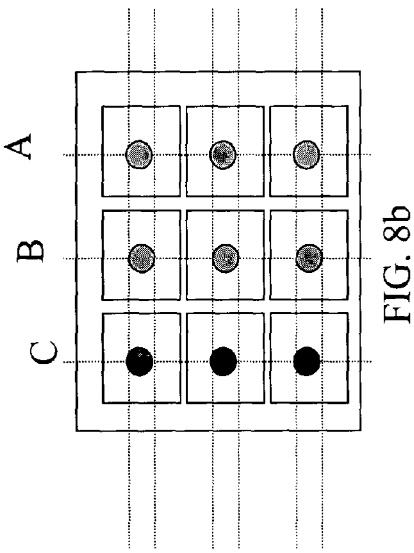
Figure 8C:
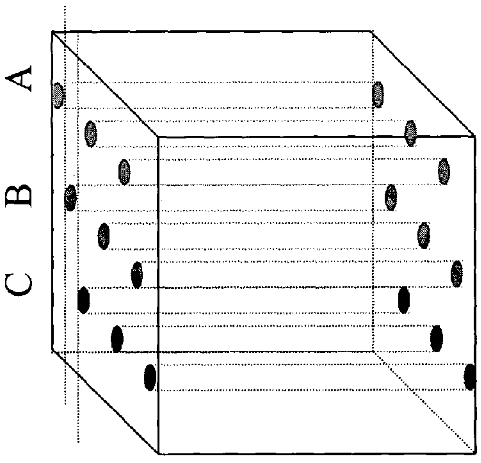
Figure 8D:
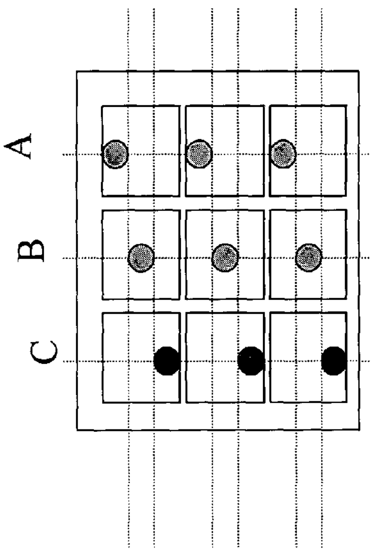

For example, using the crabbing scan technique, for a 1.5-micron pitch sensor element array and 0.5-micron diameter microchannels as shown in FIGS. 8*a* and 8*b*, the rotation required will be $\cos^{-1}(0.5/1.5)=70.5$ degrees=1.23 Radians. Similarly, for a 1.0 micron pitch sensing element array and 0.5-micron diameter microchannels, to achieve the same resolution the rotation required will be only $\cos^{-1}(0.5/1.0)=60$ degrees=1.05 Radians. By extension, a 2-dimensional array will have even greater coverage, and the calculation for the distance between parallel paths traced by other than immediately adjacent scan elements is similarly computed.

FIG. 10 shows a system for reconstructing the images obtained by the microscopes of these embodiments. The sensor data is reconstructed by a computer, under the control of a computer program, to generate an image. Such a computer program will also include both a calibration technique to determine which elements are fully functioning, which elements are illuminated by different wavelength light for color imaging, and a tracking algorithm to compensate for jitter in the movement of the sensor array over the sample.

This jitter may be caused by uneven friction between the sample surface and the microscope or may be caused by the drive mechanism for movement. The tracking algorithm relies on markers on the sample that may be naturally occurring on the sample itself or artificially created for the purpose of tracking and removing jitter in the image caused by irregular movement or friction. All embodiments are built in a scanning mode so that they may move relative to their respective sample.

The crabbing scan technique illustrates multiple redundant readings of the same, static image location that would then be correlated by a computer program that computes the parallel tracks based on the known physical dimensions and configuration of the sensor array along with the yaw angle. Further, the computer program would also be able to determine proper registration, that is orientation of the partially overlapping images, both during calibration as well as operation, based on the regularity of extracted features in these overlapping images or by using artificially placed markers on the sample itself. These markers should best be placed so that the microscope will have at least one marker in view of the sensing array at all times. Hence, the distance between the markers, if used, cannot be greater than the profile of the sensing array in the direction of traversal.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A solid-state scanning microscope, comprising:

a source of collimated radiant energy;

a plurality of narrow angle filters comprising a microchannel structure to permit the passage of only unscattered radiant energy through the microchannels, the microchannel structure having a first end and a second end;

a solid-state sensing array comprising a plurality of sensing elements, attached at the first end of the microchannel structure, the sensing elements being sensitive to radiant energy, a plurality of the microchannels being aligned each to correspond with an individual sensor element of the solid-state sensing array;

a planar member of an optically conductive material suitable for conducting radiant energy, the planar member having a first side and a second side, the first side of the planar member being placed perpendicular to the second end of the microchannel structure and attached to the microchannel structure allowing for an air-gap between the planar member and the microchannel structure;

an index matching fluid placed adjacent to the second side of the planar member, the index matching fluid being matched to the index of the planar member, the index matching fluid continuously filling the region between the surface of a sample and the second side of the planar member; and a prism placed upon the planar member so as to conduct the source of radiant energy operatively into the planar member, the radiant energy being reflected by the first side and not reflected by the second side of the planar member, the radiant energy escaping the second side of the planar member to illuminate the surface of the sample, some portion of the radiant energy being reflected by the sample to enter the microchannels, that portion of the radiant energy entering the microchannels that is parallel to the microchannel walls travels to the solid-state sensing elements to generate electrical signals that can enable an image to be reconstructed by an external device.

2. The solid-state scanning microscope of claim 1, wherein the radiant energy is laser light radiation.

3. The solid-state scanning microscope of claim 1, wherein the radiant energy is visible light radiation.

4. The solid-state scanning microscope of claim 1, wherein the source of radiant energy is a solid-state emitter.

5. A solid-state scanning microscope, comprising:

a scanning stage for providing structural support for moving the microscope, the scanning stage having a first side and a second side;

a solid-state emitter for radiating energy, the emitter having a first side and a second side, the first side of the emitter radiating energy, the second side of the emitter mounted to the first side of the scanning stage;

a waveguide having a first end, a second end, and an internally reflective surface, the first end of the waveguide being attached to the first side of the solid state emitter allowing radiant energy from the solid-state emitter to enter into the waveguide to be reflected by the internally reflective surface, the reflected radiant energy exiting at the second end of the waveguide;

a narrow angle filter comprising a microchannel to permit the passage of only unscattered radiant energy through the microchannel, the microchannel having a first end and a second end;

a beam splitting element adjacent to the second end of the waveguide and near a sample, the beam splitting element having a first side, a second side, and a third side, wherein the first side of the beam splitting element is perpendicular to the sample and receives the reflected radiant energy from the waveguide and conducts the radiant energy to exit the second side of the beam splitting element, the second side of the beam splitting element being adjacent to a sample and directing a portion of the radiant energy to the sample and receiving some portion of the radiant energy reflected by the sample, the third side of the beam splitting element being opposite the second side of the beam splitting element and adjacent to the second end of the microchannels, the third side of the beam splitting element directing some portion of the reflected radiant energy to enter the microchannels, some portion of the radiant energy being reflected by the sample to enter the microchannel; and a solid-state sensing element having a first side and a second side, the sensing element detecting radiant energy from the first side, the second side of the sensing element mounted to the first side of the scanning stage adjacent to the solid state emitter, wherein that portion of the radiant energy entering the microchannel that is parallel to the microchannel walls travels to the sensing element to generate an electrical signal that can enable an image to be reconstructed by an external device.

6. The solid-state scanning microscope of claim 5, wherein the beam splitting element has a polarizing filter.

7. A color solid-state scanning microscope, comprising:

a scanning stage for providing structural support for moving the microscope, the scanning stage having a first side and a second side;

a plurality of solid-state emitters for radiating energy, the wavelength of radiant energy of a predetermined number solid-state emitters is of at least two substantially different wavelengths, each emitter having a first side and a second side, the first side of each emitter radiates energy, the second side of each emitter is mounted to the first side of the scanning stage;

a plurality of waveguides, each waveguide having a first end, a second end, and an internally reflective surface, the first end of each waveguide being attached to the first side of a solid stale emitter allowing radiant energy from the solid-state emitter to enter into the waveguide to be reflected by the internally reflective surface, the reflected radiant energy exiting at the second end of the waveguide;

a plurality of narrow angle filters comprising a microchannel structure to permit the passage of only unscattered radiant energy through the microchannel, the microchannel having a first end and a second end;

a plurality of beam splitting elements, each beam splitting element adjacent to the second end of the waveguide and near a sample, the beam splitting elements each having a first side, a second side, and a third side, wherein the first side of each beam splitting element is perpendicular to the sample and receives the reflected radiant energy from the waveguide and conducts the radiant energy to exit the second side of the beam splitting element, the second side of the beam splitting element being adjacent to a sample and directing a portion of the radiant energy to the sample and receiving some portion of the radiant energy reflected by the sample, the third side of the beam splitting element being opposite the second side of the beam splitting element and adjacent to the second end of the microchannels, the third side of the beam splitting element directing some portion of the reflected radiant energy to enter the microchannels, some portion of the radiant energy being reflected by the sample to enter the microchannel; and a plurality of solid-state sensing elements, each solid-state sensing element having a first side and a second side, the sensing element detecting radiant energy from the first side, the second side of the sensing element mounted to the first side of the scanning stage adjacent to the solid state emitter, wherein that portion of the radiant energy entering the microchannel that is parallel to the microchannel walls travels to the sensing element to generate an electrical signal that can enable an image to be reconstructed by an external device.

8. The color solid-state scanning microscope of claim 7, wherein a predetermined number of beam splitting elements have a polarizing filter.

* * * * *